(12) United States Patent
Qian et al.

(10) Patent No.: US 12,105,659 B2
(45) Date of Patent: Oct. 1, 2024

(54) ACTIVE CABLE WITH REMOTE END CONTROL ACCESS

(71) Applicant: CREDO TECHNOLOGY GROUP LTD, Grand Cayman (KY)

(72) Inventors: Haoli Qian, Fremont, CA (US); Evan Lin, Taipei (TW); Sheng Huang, San Jose, CA (US); Donald Barnetson, Fremont, CA (US)

(73) Assignee: Credo Technology Group Limited, Grand Cayman (KY)

( * ) Notice: Subject to any disclaimer, the term of this patent is extended or adjusted under 35 U.S.C. 154(b) by 75 days.

(21) Appl. No.: 17/805,158

(22) Filed: Jun. 2, 2022

(65) Prior Publication Data

US 2023/0394003 A1    Dec. 7, 2023

(51) Int. Cl.
*G06F 13/40* (2006.01)
*G06F 8/61* (2018.01)

(52) U.S. Cl.
CPC ............ *G06F 13/4068* (2013.01); *G06F 8/61* (2013.01)

(58) Field of Classification Search
CPC .................................................. G06F 13/4068
See application file for complete search history.

(56) References Cited

U.S. PATENT DOCUMENTS

| | | | |
|---|---|---|---|
| 10,877,233 B1 | 12/2020 | Dai | |
| 10,944,584 B1 | 3/2021 | Cheng | |
| 11,012,252 B2 | 5/2021 | Lam | |
| 11,018,709 B2 | 5/2021 | Lam | |
| 11,032,111 B2 | 6/2021 | Sun | |
| 11,137,550 B2 | 10/2021 | Chen | |
| 11,218,186 B2 | 1/2022 | Lin | |
| 2007/0168731 A1* | 7/2007 | Lambrache | G06F 11/3648 714/30 |
| 2007/0168746 A1* | 7/2007 | Righi | G06F 11/3656 714/38.11 |
| 2020/0350997 A1* | 11/2020 | Giziewicz | H04B 10/40 |
| 2020/0403897 A1* | 12/2020 | Dai | G06F 11/3636 |

(Continued)

OTHER PUBLICATIONS

Management Data Input/Output. (Nov. 25, 2018). Wikiepedia. Retrieved Jan. 23, 2019, from https://en.wikipedia.org/wiki/Management_Data_Input/Output.

(Continued)

*Primary Examiner* — David E Martinez
(74) *Attorney, Agent, or Firm* — Ramey LLP; Daniel J. Krueger

(57) ABSTRACT

Cable designs and methods are provided herein to enable remote end access to active cable controllers for monitoring and upgrade operations. One illustrative network cable design includes: a first end connector configured to couple with a first host port and a second end connector configured to couple with a second host port, each of the first and second end connectors configured to convey a data stream in each direction via optical or electrical conductors connected between the first and second end connectors; a controller and a powered transceiver circuit included in the first end connector, the controller operable to configure operation of the powered transceiver circuit; and electrical contacts in the second end connector for a management bus to convey information from the second host port to the controller in the first end connector.

16 Claims, 5 Drawing Sheets

(56) References Cited

U.S. PATENT DOCUMENTS

2021/0234567 A1    7/2021    Lam
2021/0280996 A1    9/2021    Liu
2022/0021603 A1    1/2022    Fang

OTHER PUBLICATIONS

QSFP-DD MSA—QSFP-DD Hardware Specification for QSFP Double Density 8X Pluggable Transceiver Rev 4.0 Candidate. Aug. 15, 2018.
DSFP-MSA Specification for Dual Small Form Factor Pluggable Module, Rev. 1.0; Sep. 12, 2018, 31 pages.
SFP-DD Management Interface Specification, Rev. 1.0; Sep. 18, 2019, 153 pages.
SFP-DD MSA, SFP-DD Hardware Specification for SFP Double Density 2X Pluggable Transceiver, Rev. 3.0; Apr. 10, 2019, 60 pages.

* cited by examiner

FIG. 4
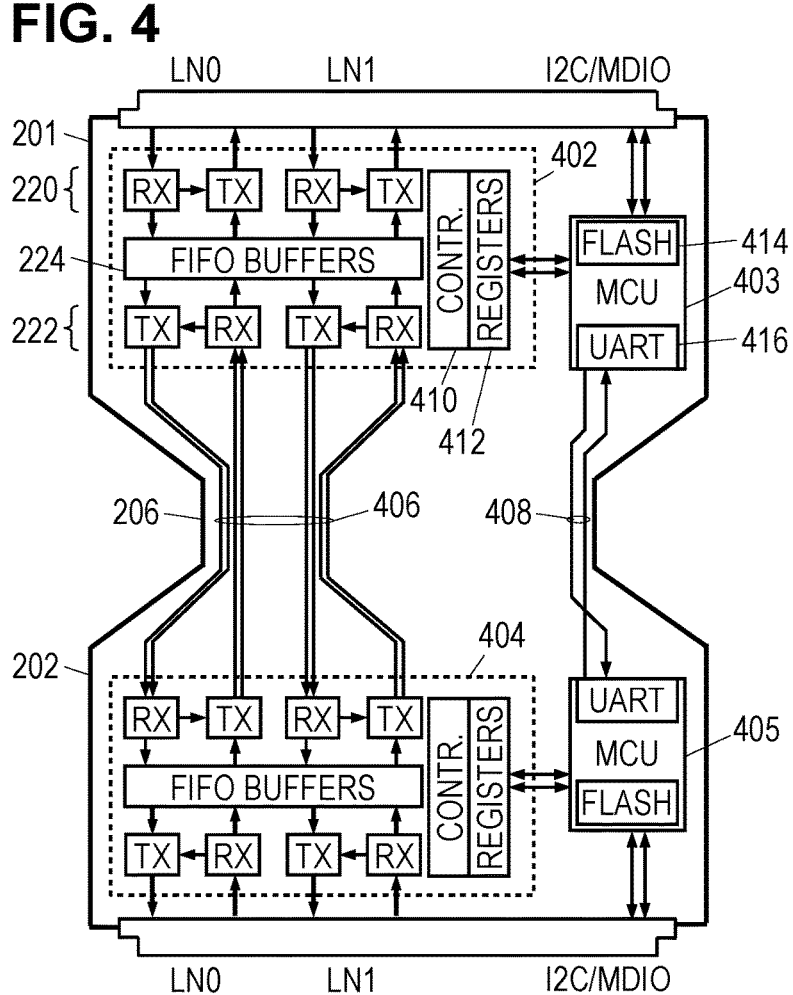
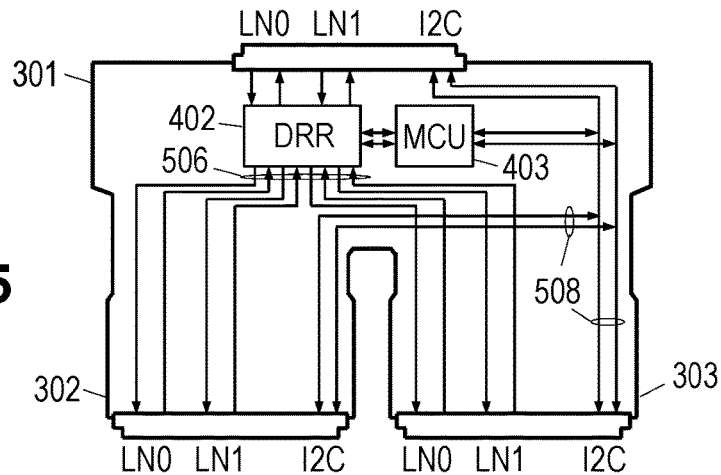
FIG. 5

ACTIVE CABLE WITH REMOTE END CONTROL ACCESS

BACKGROUND

Data centers for cloud computing tend to be large, complex installations having hundreds of thousands servers interconnected by routers and a correspondingly large number of network cables, each cable being asked to support data transfer rates near the limits of what is currently achievable. To enhance their performance, so-called "active" cables typically rely on embedded electronics that perform signal processing on the received signals (and often on the signals to be transmitted as well). Some cable manufacturers make the embedded electronics configurable, enabling the cables to be upgraded as new processing techniques are tested and proven to yield better performance. However, given the number of cables in a typical data center, the upgrade process can be quite challenging.

SUMMARY

Accordingly, there are disclosed herein novel cable designs and methods enabling remote end access to active cable controllers for monitoring and upgrade operations. One illustrative network cable design includes: a first end connector configured to couple with a first host port and a second end connector configured to couple with a second host port, each of the first and second end connectors configured to convey a data stream in each direction via optical or electrical conductors connected between the first and second end connectors; a controller and a data recovery and remodulation circuit included in the first end connector, the controller operable to configure operation of the data recovery and remodulation circuit; and electrical contacts in the second end connector for a management bus to convey information from the second host port to the controller in the first end connector.

An illustrative method includes: configuring operation of a first data recovery and remodulation circuit in a first end connector coupled to a first host port using a first controller in the first end connector; transmitting a data stream in each direction via optical or electrical conductors connected between the first end connector and a second end connector coupled to a second host port; and conveying management bus information from the second host port to the first controller via electrical contacts in the second end connector.

Each of the foregoing design and method may be implemented individually or in combination, and may be implemented with one or more of the following features in any suitable combination: 1. the management bus is a shared bus that connects the controller to the electrical contacts in the second end connector and to electrical contacts in the first end connector. 2. the management bus further connects the controller to electrical contacts in a third end connector. 3. the second end connector includes a second controller and a second data recovery and remodulation circuit, the second controller operable to configure operation of the second data recovery and remodulation circuit. 4. the first end connector includes electric contacts for a management bus to convey information from the first host port to the second controller. 5. said controller and said second controller are connected by a serial bus. 6. the second controller uses the serial bus to forward information received via the electrical contacts in the second end connector. 7. the serial bus connects to said controller and said second controller via universal asynchronous receiver-transmitter (UART) circuitry. 8. said data recovery and remodulation circuit and said second data recovery and remodulation circuit modify data stream alignment markers to implement a hidden channel for conveying management bus information to each other. 9. a nonvolatile memory coupled to the controller to provide firmware. 10. the information from the second host port comprises a firmware image for storage in the nonvolatile memory.

BRIEF DESCRIPTION OF THE DRAWINGS

FIG. 4 is a block diagram of an illustrative two-ended active cable.

FIG. 5 is a block diagram of an illustrative three-ended active cable.

DETAILED DESCRIPTION

Figure 1:
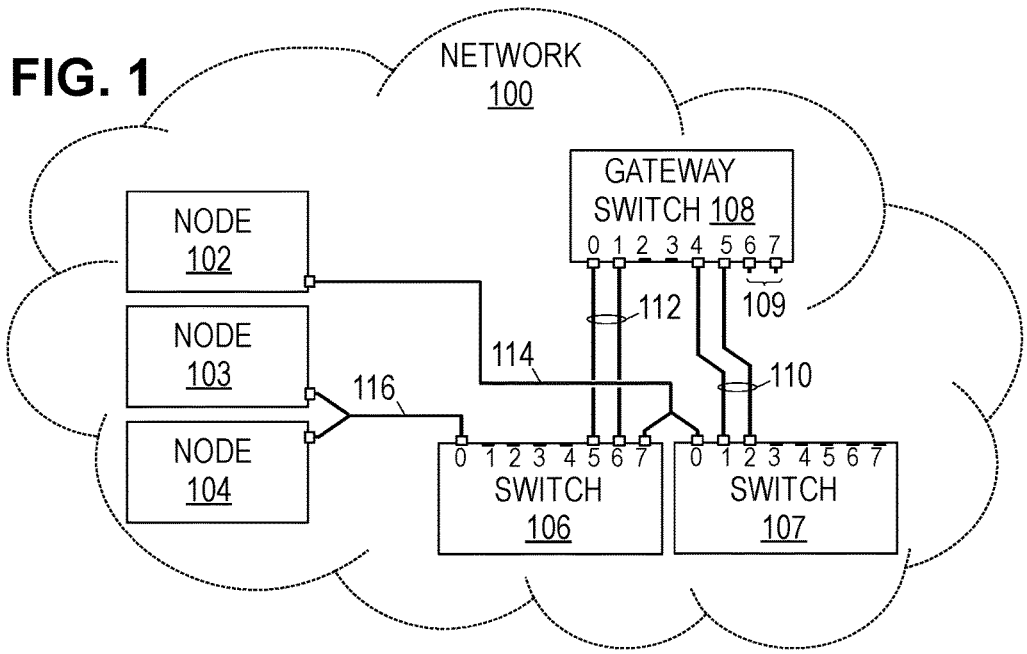
FIG. 1 shows an illustrative network.

While specific embodiments are given in the drawings and the following description, keep in mind that they do not limit the disclosure. On the contrary, they provide the foundation for one of ordinary skill to discern the alternative forms, equivalents, and modifications that are encompassed in the scope of the appended claims.

FIG. 1 shows an illustrative network 100, which includes three network nodes 102, 103, 104, and three switches 106, 107, 108. The network nodes 102-104 each represent a device capable of sending and receiving communications via a network, such as a server, a storage device, a workstation, a phone, a printer, a scanner, a network hub, a network bridge, a switch, a router, or any device having a network port. The Ethernet Standard (IEEE Std 802.3-2015 or one of its updates) is used as an example herein, but any wired, optical, or cabled network standard would also be suitable.

Switches 106-108 are each a device having multiple network ports and an internal mechanism for directing messages received on one of the network ports to another of the network ports. As used hereinafter, the term "switch" includes not just traditional network switches, but also routers and network bridges. Frequently one or more of the switch ports 109 connect to other switches to enable communication between the nodes 102-104 and a wider-area network such as the Internet.

The illustrative network includes two-ended network cables 110 connecting two network ports of switch 107 to corresponding network ports of switch 108, and cables 112 connecting two ports of switch 106 to corresponding ports of switch 108. A three-ended cable 114 connects a network port of node 102 to one port of switch 106 and one port of switch 107. Conversely, a three-ended cable 116 connects one switch port 106 to a port of node 103 and a port of node 104. Three-ended cables 114, 116 may be conventional breakout cables or enhanced cables offering two of the three ends for redundant connections to third, shared end, such that each cable connector can support the full data stream bandwidth, enabling one of the ports to be bypassed when a fault is detected.

Figure 2:
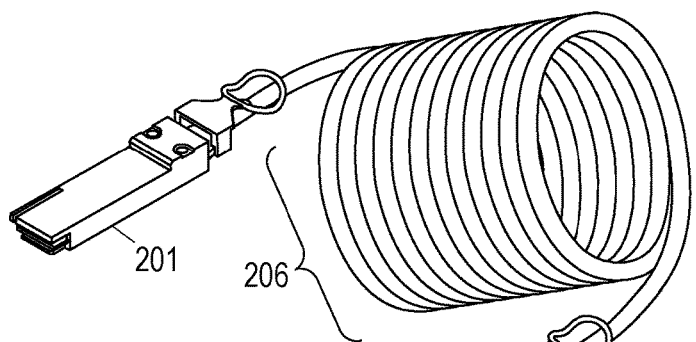
FIG. 2 is an isometric view of an illustrative two-ended active cable.

FIG. 2 shows an illustrative two-ended cable having a first end 201 connected to a second end 202 via a cord 206 having electrical conductors and/or optical fibers for digital communications signals to convey data streams in each direction pursuant to network communications standard such as the Institute of Electrical and Electronics Engineers (IEEE) Standard for Ethernet, IEEE Std 802.3-2015 or any of its periodic updates, which will be familiar to those of ordinary skill in the art to which this application pertains. To enable communication at higher bandwidths and/or over extended cable lengths, either or both connectors 201, 202 may include a powered transceiver that preferably performs clock and data recovery (CDR) and remodulation of data streams flowing in each direction.

These powered transceivers are also known as data recovery and remodulation (DRR) devices. Notably, these transceivers may perform CDR and remodulation not only of the outbound data streams as they exit the cable, but also of the inbound data streams as they enter the cable. In certain alternative embodiments, the powered transceivers provide amplification, equalization, and/or conversion between electrical and optical signals, without performing CDR.

In some contemplated implementations, the cable connectors 201, 202 are quad small form-factor pluggable (QSFP) transceiver modules, and more specifically, QSFP28 transceiver modules, which exchange CAUI-4 data streams with the host. In other contemplated implementations, the cable connectors are dual small form-factor pluggable (DSFP) or small form-factor pluggable, double-density (SFP-DD) transceiver modules, which exchange 100GBASE-KR2 data streams with the host. (More properly, this SFP-DD transceiver is called SFP56-DD.) In still other contemplated implementations, the cable connectors are different, such as with a QSFP28 to SFP56-DD cable, a QSFP28 to DSFP cable, or a SFP56-DD to DSFP cable.

Figure 3:
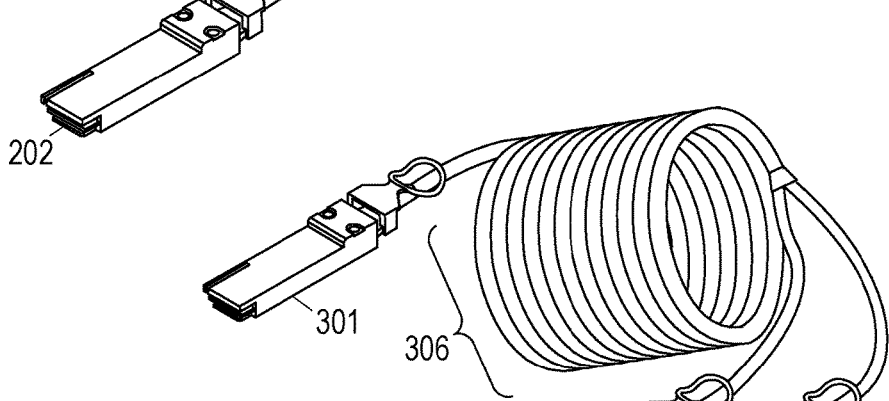
FIG. 3 is an isometric view of an illustrative three-ended active cable.

FIG. 3 is an isometric view of an illustrative three-ended cable having a first, non-redundant connector 301 connected to a second and third redundant connectors 302, 303 by electrical, or optionally by optical, conductors 306. Either or both the non-redundant connector 301 and redundant connectors 302, 303 may contain powered transceivers to improve performance. If implemented as a breakout cable, the data streams conveyed by the split ends 302, 303 are merged at the unary end 301. Though only two-ended and three-ended cables have been shown, we note that the principles discussed herein are applicable to N-ended cables where N is any integer greater than 2. (1:3 and 1:4 cables are specifically contemplated.)

FIG. 4 is a function-block diagram of an illustrative two-ended cable. Connector 201 is adapted to fit a standard-compliant Ethernet port in a first host device to receive an outbound data stream from the host device and to provide an inbound data stream to the host device via electrical contacts for one or more bidirectional data lanes (LN0, LN1). Similarly, connector 202 fits an Ethernet port of a second host device. Connector 201 includes a first DRR device 402 to perform CDR and remodulation of the data streams entering and exiting the cable at connector 201, and connector 202 includes a second DRR device 404 to perform CDR and re-modulation of the data streams entering and exiting the cable at connector 202. The DRR devices 402, 404 may be integrated circuits mounted on a printed circuit board and connected to edge connector contacts via circuit board traces. Electrical conductors 406 (or alternatively, optical fibers) convey the data streams transiting between DRR devices 402, 404.

In at least some contemplated implementations, the printed circuit boards each also support a microcontroller unit (MCU) 403, 405. Each DRR device 402, 404 is coupled to a respective MCU device 403, 405, which configures the operation of the DRR device via a first two-wire bus. At power-on, the MCU devices 403, 405 load settings from a nonvolatile memory 414 into the DRR device's registers 412 to configure operation of the DRR's internal controller 410. The host device can access the local MCU device 403, 405 via a second two-wire bus that operates in accordance with the I2C bus protocol and/or the faster MDIO protocol. With this access to the local MCU device 403, 405, the host device can adjust the cable's local operating parameters and monitor the cable's performance.

FIG. 4 further shows electrical conductors 408 for management bus communications between the DRR devices 402, 404. In FIG. 4, the conductors support unidirectional serial communications between UART (universal asynchronous receiver-transmitter) modules 416, but other management bus implementations would also be suitable. With the management bus connecting the MCUs, each host device can access not only the local MCU to set operating parameters and monitor performance, but also the MCU in the remote end connector(s). As discussed further below, this feature is expected to facilitate cable performance monitoring and upgrading operations in data centers.

FIG. 5 is a function-block diagram of an illustrative three-ended cable. Non-redundant connector 301 includes a DRR device 402 coupled to MCU 403. Channel conductors 506 couple the DRR device 402 to electrical contacts in the remote end connectors 302, 303. Management bus conductors 508 also couple the MCU 403 to management bus contacts in the remote end connectors 302, 303. FIG. 5 shows the management bus as a shared I2C bus that enables each of the hosts to arbitrate for access to the MCU 403. Alternatively, the MCU 403 could be coupled to each end connector by point-to-point management bus conductors to support, e.g., I2C or MDIO links.

Figure 6:
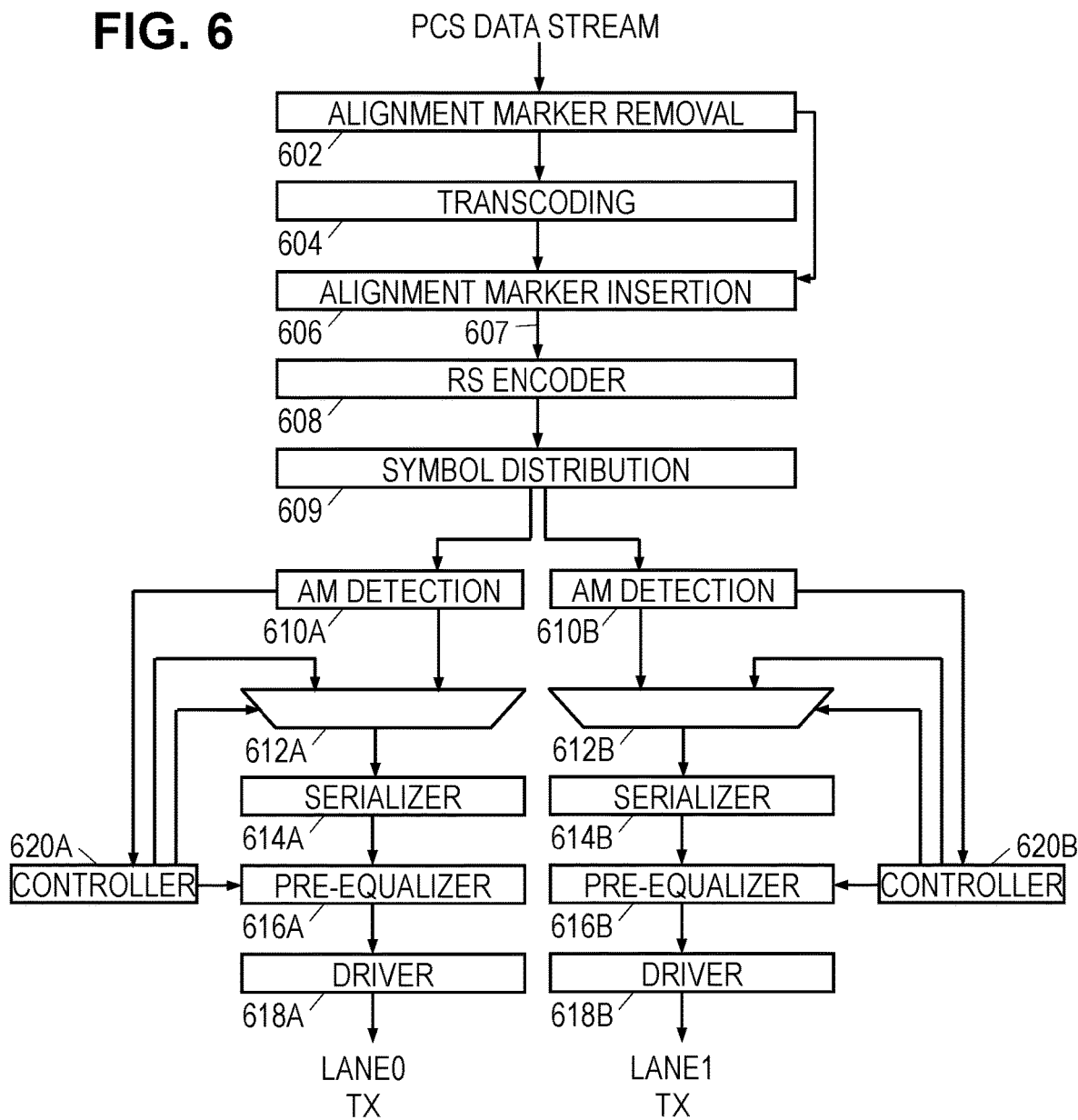
FIG. 6 is a block diagram of a transmit chain in an illustrative multi-lane transceiver.
Figure 7:
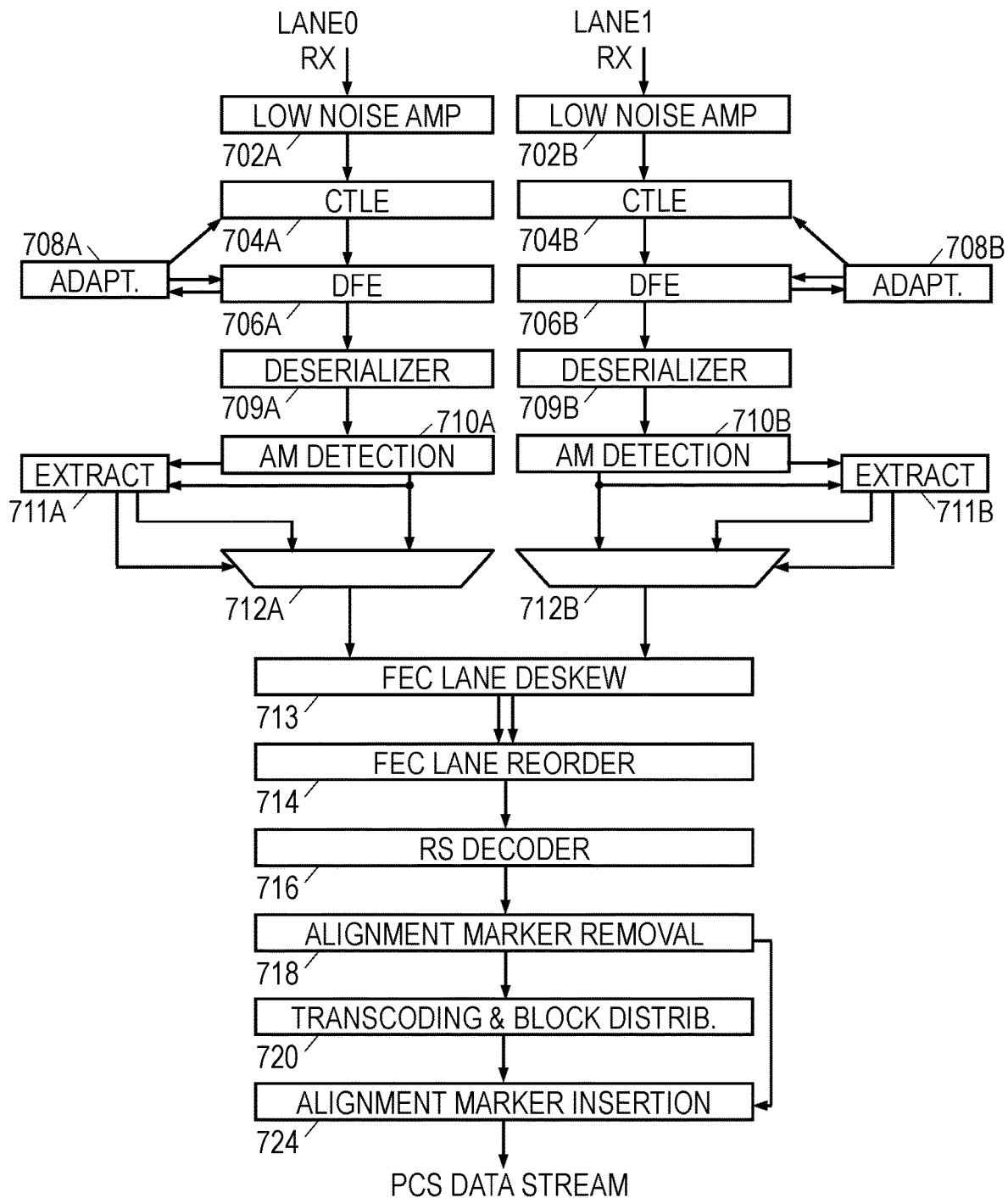
FIG. 7 is a block diagram of a receive chain in an illustrative multi-lane transceiver.

Other contemplated cable implementations eliminate any need for dedicated management bus conductors along the length of the cable by, e.g., implementing a hidden channel within the transit data streams. To illustrate how this might be done, FIGS. 6 and 7 provide a more detailed block diagram of transmit and receive chains designed to couple with a circuit using one of the physical coding sublayer (PCS) interface protocols specified in the Ethernet Standard. Pursuant to the standard, the PCS data stream is already encoded with a transmission code that provides DC balance and enables timing recovery. The PCS data stream lanes further include PCS alignment markers for synchronizing the lanes with each other.

Once the data stream lanes are aligned, an alignment marker removal module 602 removes the alignment markers from each lane, passing them to a downstream alignment marker insertion module 606. A transcoding module 604 modifies the transmission code from a 64b/66b code to a 256b/257b code more appropriate for use with the Reed-Solomon encoder. By repeatedly transcoding four 66-bit blocks taken in parallel from the four incoming lanes into individual 257-bit blocks, the transcoding module may essentially convert a multiple lane data stream into a single lane data stream.

The previously-mentioned alignment marker insertion module 606 accepts the PCS alignment marker information from removal module 602 and the single-lane data stream from transcoding module 604. The insertion module 606 combines the alignment marker information from the four lanes into a set of grouped alignment markers in a 257-bit block and, accounting for the operation of the transcoding module 604, inserts the alignment block in a fashion that preserves its location relative to the other data in the data stream 607. The alignment marker insertion block is designed to account for the operation of the encoder module 608 and symbol distribution module 609 such that the alignment markers appear essentially intact and in order in the two-lane transmit data stream output by symbol distribution module 609.

A Reed-Solomon (RS) encoder module 608 operates on 10-bit "symbol" blocks of the data stream 607 from the insertion module 606, adding redundancy to enable downstream correction of symbol errors. Typically, the encoder module 608 operates to preserve the original data stream content while appending so-called "parity" information, e.g., 30 parity symbol blocks appended to 514 data symbol blocks to form a complete code word block. Thus the alignment blocks inserted by module 606 will remain present in the output data-stream from the encoder module. A symbol distribution module 609 distributes code word symbols across multiple transmission lanes in round-robin fashion, directing each lane to a corresponding transmitter. Optionally, an alignment marker detection module 610A (and 610B) for each lane of the transmit data stream detect the alignment markers inserted by module 606 with suitable data buffering. Alternatively, the alignment marker detection modules 610A, 610B can be omitted in favor of appropriate direct signaling from the alignment marker insertion module 606. In either case, the control modules 620A, 620B control the multiplexers 612A, 612B in each lane, based at least in part on detection signals indicating the presence of the alignment markers.

Multiplexers 612A, 612B forward the encoded data streams to serializer modules 614A, 614B during normal operations and in the absence of alignment markers. During auto-negotiation and training phases, the multiplexers supply negotiation and training data streams from the training control modules 620A, 620B to the serializers. During normal operations in the presence of alignment markers, the multiplexers 612A, 612B (acting as alignment marker replacement modules) may supply the serializer modules with modified alignment markers to convey hidden channel information. The hidden channel can convey management bus data from the MCU in one end connector to the DRR device(s) in the other end connector(s), and optionally may convey adaptation information for the pre-equalizers. The serializers 614A, 614B, each accept a stream of transmit data blocks and convert the stream of blocks into a (higher-rate) stream of channel symbols. Where, for example, a 4-PAM signal constellation is used, each serializer may produce a stream of two-bit symbols.

Each stream of channel symbols is filtered by a pre-equalizer module 616A, 616B to produce a transmit signal, which is amplified and supplied to the transmit channel by a driver 618A, 618B. The pre-equalizer modules compensate for at least some of the channel dispersion, reducing or eliminating the need for receiver-side equalization. Such pre-equalization may be advantageous in that it avoids the noise enhancement often associated with receiver-side equalization and enables digital filtering with a reduced bit-width.

During the training process, the one or more controllers 620A, 620B, receive backchannel information extracted by the receiver from the received data stream. The backchannel information may include management bus information to be conveyed to the local MCU, and may further include adaptation information that the controller can use to adjust the coefficients of the pre-equalization filters. The controllers further receive management bus information from the local MCU to be conveyed to the remote MCU(s), and "remote adaptation info", which includes locally-generated information for adapting the coefficients of the pre-equalization filter in the remote node. Based on this information the controllers populate the relevant fields of the training frames to provide backchannel information to the remote node. As training frames are employed only during the training phase, and as it may be desirable to continue updating the pre-equalization filter during normal operations, the controller(s) 620 may include similar hidden channel information in or with the modified alignment markers supplied via multiplexers 612A, 612B during normal operations.

We now turn to FIG. 7, which shows a receive chain obtaining analog electrical signals from different receive channels (indicated by Lane0-rx and Lane1-rx). These may be obtained directly from electrical conductors, if the physical medium is an electrical bus or cable, or indirectly via transducers if the physical medium is wireless. Optional low noise amplifiers (LNA) 702A,B, each provide a high input impedance to minimize channel loading and amplifies the receive signal to drive the input of a continuous time linear equalizer (CTLE) filter 704A,B.

CTLE filters 704A,B provide continuous time filtering to shape the receive signal spectrum in an adaptive fashion to reduce the length of the channel impulse response while minimizing leading inter-symbol interference (ISI). Decision feedback equalizers (DFE) 706A,B operate on the filtered signals to correct for trailing ISI and detect each transmitted channel bit or symbol, thereby producing a demodulated digital data stream. Some embodiments employ oversampling. Clock recovery and adaptation modules 708A,B derive a sampling clock signal from the input and/or output of the DFE's decision element and supply it back to the DFE to control timing of the symbol detection. The adaptation modules 708A,B further derive an error signal of the DFE decision element's input relative to the output or (during the training phase) to a known training pattern, and use the error signal to adapt the DFE coefficient (s) and the response of the CTLE filters. The adaptation modules still further use the error signal to generate "remote info", i.e., adaptation information for the remote pre-equalizers. This remote info is supplied to the controller(s) 620 (FIG. 6).

Deserializers 709A,B group the digital receive data stream bits or symbols into blocks to enable the use of lower clock rates for subsequent on-chip operations. Alignment marker detection modules 710A, 710B monitor the receive data stream to detect the CM pattern of the alignment markers and achieve alignment marker lock during normal operations, or during training operations to detect the training frame markers and achieve lock thereto. The backchannel information extraction modules 711A, 711B extract the backchannel information from the appropriate portions of the training frames and alignment markers, providing the pre-equalizer adaptation information and status report information to the controller(s) 620. During normal operations, the multiplexers 712A, 712B, operating under control of the extraction modules 711A, 711B, replace the modified alignment markers with sets of grouped PCS alignment markers, thereby hiding the hidden channel information fields from the higher layers. The detection modules 710 may communicate the alignment marker detection information to the FEC lane deskew module 713.

During normal operations, the receive data streams from the deserializers are aligned by an FEC lane deskew module 713. If the FEC lanes have somehow gotten switched, an FEC lane reordering module 714 detects the switch based on the contents of the alignment markers and compensates for the switch as the two lanes are multiplexed on a symbol-block basis into a single lane. An RS decoder module 716 operates on the single lane data stream to detect and correct any symbol errors, removing the FEC coding redundancy (parity symbols) during the decoding process.

A transcoding module 720 converts the 256b/257b transmission code words into blocks of four 64b/66b transmission code words distributing the 66-bit code word blocks across four PCS lanes. An alignment marker insertion module 724 converts the sets of grouped alignment markers into individual alignment markers having lane-specific UM patterns, and inserts the individual alignment markers at appropriate positions in the four lanes, accounting for the operation of the transcoding module 720. The multi-lane PCS data stream is provided to the higher hierarchy layers of the node for eventual communication of the conveyed data to the destination application.

Multiple such receive and transmit chains may be included within each of the DRR devices. The DRR devices provide buffering between the receive and transmit chains, optionally providing format conversion e.g., between NRZ and PAM4 signal constellations, between symbol rates, and/or between numbers of data lanes. Data stream steering/broadcasting may be provided from the non-redundant end connector to the redundant end connectors, and data stream selection/multiplexing provided from redundant end connectors to the non-redundant end connector.

Whether the remote end connector accessibility is provided by a serial management bus between local and remote MCUs, by a direct I2C bus from the local connector to the remote MCU, or by a hidden channel between DRR devices, it enables the cable to be monitored and controlled from a single end rather than requiring each end of an N-ended cable to participate. Where only one MCU is present, each host can provide commands to it to retrieve and update register information, thereby determining status, performance, parameter settings, and even update firmware. Where multiple end connectors each have an MCU, each host can address commands to any selected one of the MCUs, enabling each one of them to retrieve and update register information from all the MCUs.

Various mechanisms are contemplated to cope with any potential latency when the MCU in a local end facilitates communication with the MCU in a remote end. One contemplated mechanism is the real-time read, in which the local MCU receives the read command but delays any response until the requested data has been fetched from the remote MCU, using clock stretching or a similar technique to stall for time.

Another contemplated mechanism is the delayed read request, in which the local MCU determines that the requested data is not available locally and sends an acknowledgement of the request. The local MCU then fetches the requested data to a local cache and sends a notification to the host that the data is ready to be read. The host can then repeat the request and the local MCU can respond with the requested data from the local cache.

A third contemplated mechanism is for the local MCU to obtain relevant data from the remote MCUs either periodically or as it gets updated, caching the obtained data for immediate availability for read commands on the management bus.

The remote end connector accessibility greatly facilitates cable performance monitoring and maintenance in data center environments. Rather than forcing each host port to participate, server and switch alike, the monitoring and maintenance services can optionally be consolidated within the switches, thereby eliminating any need to provide the firmware image to each network node and greatly reducing bandwidth consumption. Alternatively, the services can be distributed to the server nodes to minimize any added processing burden on the switches. As yet another alternative, each host port can provide the service to add redundancy to the process, ensuring each cable is monitored and maintained even if one of its hosts happen to be disconnected or shut down when the process is performed.

Figure 8:
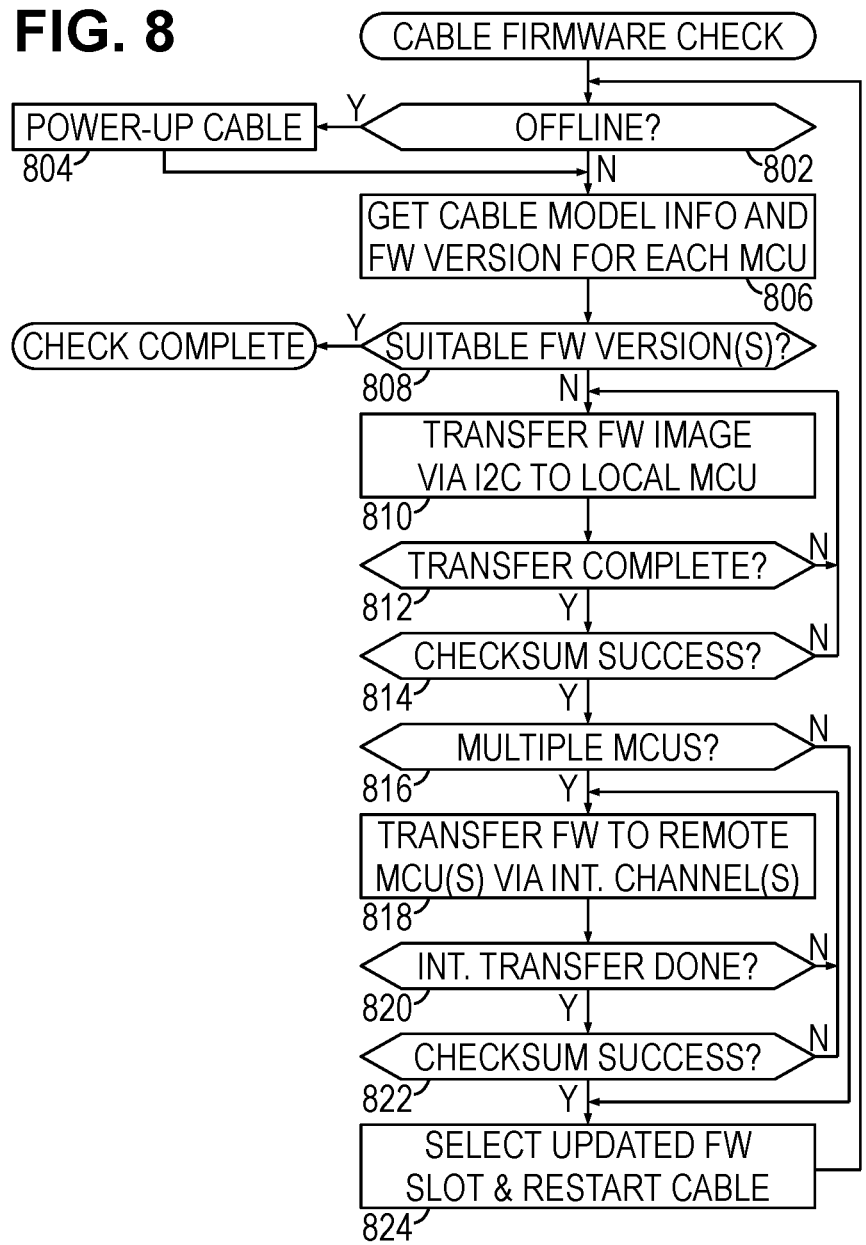
FIG. 8 is a flow diagram of an illustrative method for remotely upgrading cable firmware.

As one example, FIG. 8 is a flow diagram of an illustrative method for upgrading cable firmware in a remote end connector of a cable. Beginning in block 802, the host checks whether the cable coupled into a local host port is offline, and if so, the host initiates the power-up process for the cable in block 804. In block 806, the host sends an inquiry via the local management bus connector pins to the MCU to obtain information regarding the cable model and version of the installed firmware. If the information indicates that multiple MCUs are present, the host addresses a similar inquiry to each of the MCUs to determine the version of their installed firmware.

In block 808, the host compares the firmware version numbers to that known to be the latest version number for that model, or otherwise determines whether the installed firmware version is acceptable. If so, the process completes successfully. Otherwise, in block 810, the host uses the management bus to write a firmware image to an inactive nonvolatile memory slot of the local MCU. A check is periodically performed in block 812 to determine whether the transfer is complete, and once it is completed, the host requests a checksum from the MCU in block 814 to confirm that the transfer was successful. If not, blocks 812-814 are repeated.

In block 816, the host determines whether the cable has any remote MCUs. If not, the host configures the MCU(s) to use the nonvolatile memory slot with the upgraded firmware in block 824, performs a restart of the cable, and returns to block 802.

If one or more remote MCUs is present, in block 818 the host instructs the local MCU to send a copy of the new firmware image to each of the remote MCUs, using the serial bus, the shared management bus, the hidden channel, or some other suitable form of internal channel between the end connectors. The host periodically checks in block 820 to determine whether the internal transfer(s) are complete. Once the transfer(s) have completed, the host requests a checksum from each of the remote MCUs in block 822 to confirm that the transfer(s) were successful. If not successful, blocks 818 to 822 are repeated. Once successful, the host in block 824 configures each of the MCUs to use the upgraded firmware on reboot, and initiates a cable restart. The process resumes in block 802.

Numerous alternative forms, equivalents, and modifications will become apparent to those skilled in the art once the above disclosure is fully appreciated. Although only two-ended and three-ended cables were shown in the figures, the disclosed principles are applicable to different cable configurations including those with more than three ends, e.g., a 1:4 breakout cable. The foregoing discussion focused on cables employing DRR devices, as such cables tend to have a greater degree of configurability. Nevertheless, the disclosed principles are also applicable to other active cables having programmable parameters for configurable operation such as those providing analog amplification, analog equalization, and/or analog conversion between electrical and optical signaling. It is intended that the claims be interpreted to embrace all such alternative forms, equivalents, and modifications that are encompassed in the scope of the appended claims.

What is claimed is:

1. An active network cable that comprises:
a first end connector configured to couple with a first host port and a second end connector configured to couple with a second host port, each of the first and second end connectors configured to convey a data stream in each direction via optical or electrical conductors connected between the first and second end connectors;
a controller and a powered transceiver circuit included in the first end connector, the controller operable to configure operation of the powered transceiver circuit; and
electrical contacts in the second end connector for a management bus to convey information from the second host port to the controller in the first end connector.

2. The cable of claim 1, wherein the management bus is a shared bus that connects the controller to the electrical contacts in the second end connector and to electrical contacts in the first end connector.

3. The cable of claim 2, wherein the management bus further connects the controller to electrical contacts in a third end connector.

4. The cable of claim 1, wherein the second end connector includes a second controller and a second powered transceiver circuit, the second controller operable to configure operation of the second powered transceiver circuit, and wherein the first end connector includes electric contacts for the management bus to convey information from the first host port to the second controller.

5. The cable of claim 4, wherein said controller and said second controller are connected by a serial bus, and wherein said second controller uses the serial bus to forward information received via the electrical contacts in the second end connector.

6. The cable of claim 5, wherein the serial bus connects to said controller and said second controller via universal asynchronous receiver-transmitter (UART) circuitry.

7. The cable of claim 4, wherein said first end connector and said second end connector each include a data recovery and remodulation circuit configured to modify data stream alignment markers to implement a hidden channel for conveying management bus information to each other.

8. The cable of claim 1, further comprising a nonvolatile memory coupled to the controller to provide firmware, wherein the information from the second host port comprises a firmware image for storage in the nonvolatile memory.

9. A method comprising:
configuring operation of a first powered transceiver circuit in a first end connector coupled to a first host port using a first controller in the first end connector;
transmitting a data stream in each direction via optical or electrical conductors connected between the first end connector and a second end connector coupled to a second host port; and
conveying management bus information from the second host port to the first controller via electrical contacts in the second end connector.

10. The method of claim 9, wherein the management bus is a shared bus that connects the controller to the electrical contacts in the second end connector and to electrical contacts in the first end connector.

11. The method of claim 10, wherein the management bus further connects the controller to electrical contacts in a third end connector.

12. The method of claim 9, further comprising:
configuring operation of a second powered transceiver circuit in the second end connector using a second controller in the second end connector; and
conveying management bus information from the first host port to the second controller.

13. The method of claim 12, wherein the first and second controllers are connected by a serial bus, and wherein said second controller uses the serial bus to forward information received via the electrical contacts in the second end connector.

14. The method of claim 13, wherein the serial bus connects to said controller and said second controller via universal asynchronous receiver-transmitter (UART) circuitry.

15. The method of claim 12, wherein said first end connector and said second end connector each include a powered transceiver circuit configured to modify data stream alignment markers to implement a hidden channel for conveying management bus information to each other.

16. The method of claim 9, wherein the first controller includes a nonvolatile memory to provide firmware, and wherein the management bus information from the second host port comprises a firmware image for storage in the nonvolatile memory.

* * * * *